Sept. 1, 1931.  J. B. BAILEY  1,821,131
MACHINE FOR PULLING AND GRINDING STALKS
Filed July 17, 1930    2 Sheets-Sheet 1

Inventor
J. B. Bailey
By Watson E. Coleman
Attorney

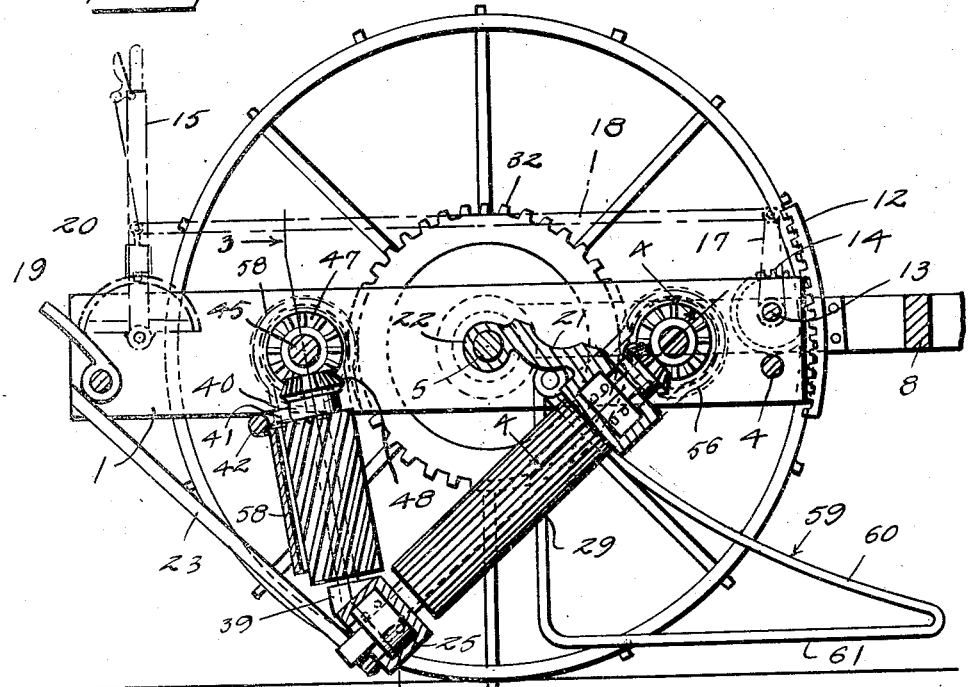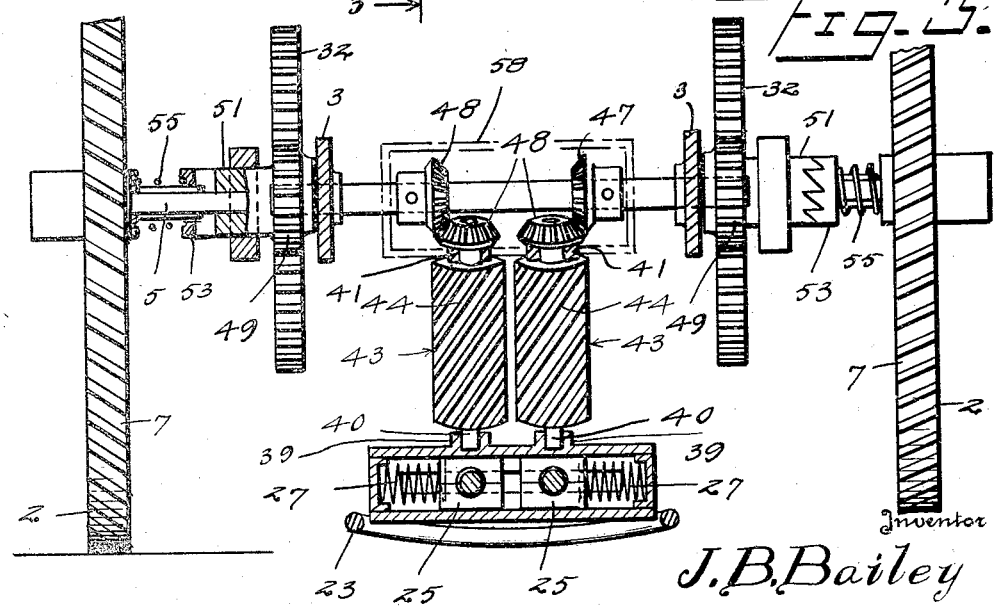

Patented Sept. 1, 1931

1,821,131

UNITED STATES PATENT OFFICE

JAMISON B. BAILEY, OF VAN ALSTYNE, TEXAS

MACHINE FOR PULLING AND GRINDING STALKS

Application filed July 17, 1930. Serial No. 468,715.

This invention relates to a machine adapted to pull stalks from the ground, grind the stalks, and deposit the ground stalks upon the ground.

The invention comprehends the provision of a novel, simple and highly efficient means of this character which shall embody stalk pulling rollers driven by ground engaging wheels, and grinding mechanism also operated by said wheels and adapted to receive the stalks from the rollers and to deposit the ground stalks on the ground.

The invention further comprehends the provision of a machine of the character stated wherein the stalk pulling rollers shall be provided with longitudinally ribbed coverings of rubber or the like, and wherein these rollers shall be mounted to yield laterally under the pressure of a large or hard article passing between the same so as to prevent injury to their coverings.

The invention further comprehends the provision of a machine of the character stated wherein the grinding mechanism shall by preference embody rollers having spiral cutting ribs, wherein the stalk pulling rollers shall be arranged in an upwardly and forwardly inclined position, and wherein the grinding rollers shall be arranged in an upwardly and rearwardly inclined position in the rear of the stalk pulling rollers, the relative arrangement of the stalk pulling rollers and the grinding rollers permitting the stalks to pass freely from the former to the latter.

The invention is hereinafter fully described and claimed, and illustrated in the accompanying drawings, wherein:—

Figure 2 is a view partly in side elevation and partly in vertical section of the machine;

Figure 3 is a sectional view taken on the planes indicated by the line 3—3 of Figure 2;

Figure 1:
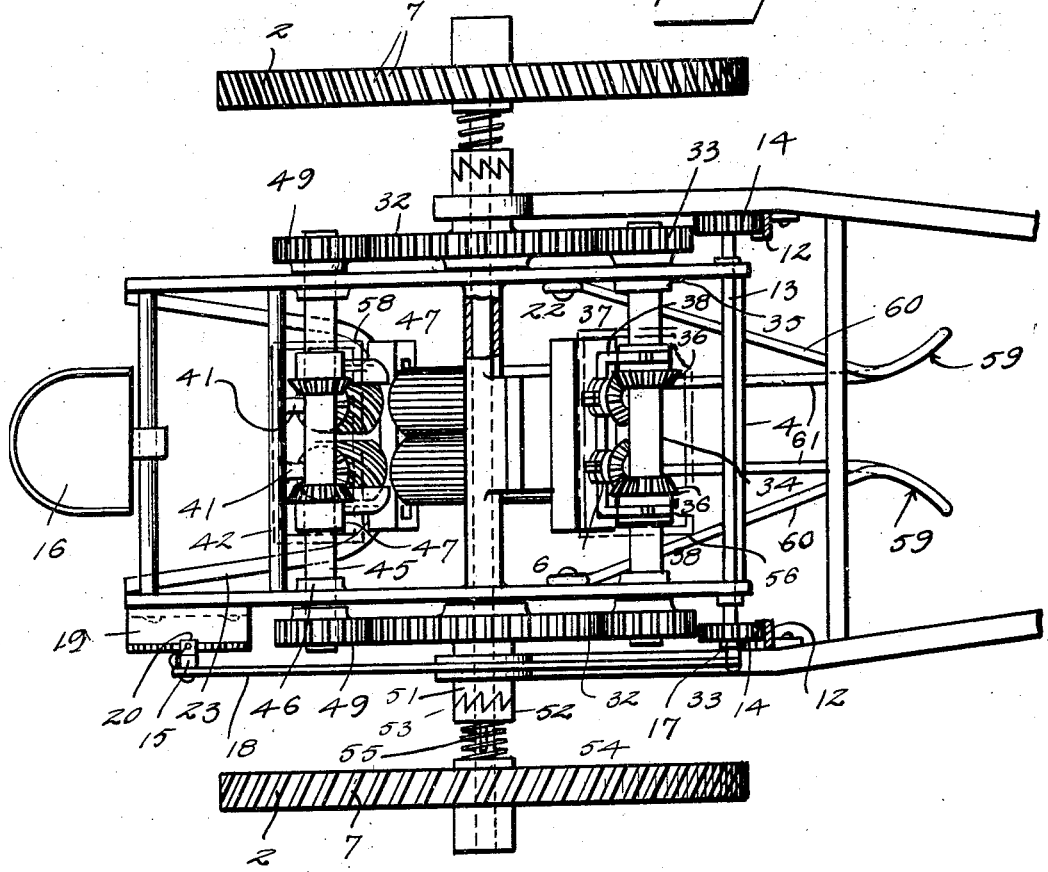
Figure 1 is a top plan view of the stalk pulling and grinding machine.
Figures 4, 5:
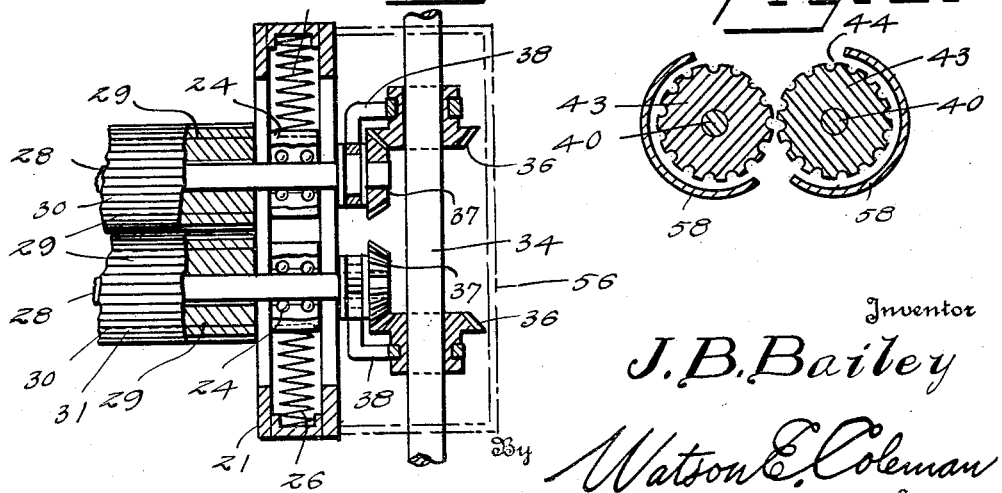
Figure 4 is a sectional view taken on the plane indicated by the line 4—4 of Figure 2.
Figure 5 is a sectional view taken on that plane extending transversely through the stalk grinding means.

The machine comprises a frame 1 which is supported by ground wheels 2, and which, while it may be of any well known or appropriate construction, is shown as embodying side bars 3 and cross bars 4. An axle 5 extends transversely through and laterally beyond the frame 1, and the frame bars 3 are provided with bearings 6 for the reception of the axle. The wheels 2, which are loosely journaled on the end portions of the axle 5, are provided at their peripheries with cleats 7 which insure the positive rotation of the wheels during the pulling of the machine over a field.

A draft yoke 8 has its ends connected to the axle 5 and extends forwardly beyond the frame 1. The draft yoke 8 may be coupled to a tractor or provided with a tongue to permit the machine to be pulled by horses. The sides of the draft yoke 8 are located laterally beyond the frame 1 so that the frame may be adjusted or rocked on the axle 6 into a horizontal or an upwardly and forwardly or a downwardly and forwardly inclined position. Means are provided for adjusting the frame 1 and holding it in adjusted position. This means which may be of any well known or appropriate construction, is shown as comprising arcuate rack bars 12 secured in upright position to the sides of the draft yoke 8 at points forwardly beyond the axle 5, a shaft 13 extending across and journaled upon the front end of the frame 1, and pinions 14 fixed to the shaft and meshing with the rack bars.

This means also comprises a hand lever 15 pivoted to one of the frame bars 3 within convenient reach of the operator's seat 16 which is secured to the rear end of the frame 1, an arm 17 fixed to the shaft 13, a link 18 connected to the lever and arm, a notched sector 19 secured to that frame bar 3 to which the lever is pivoted, and a latch 20 carried by the lever and engaging the notched sector. The lever 15 is, after being released by retracting the latch 20, moved forwardly if it is desired to adjust the frame 1 upwardly and moved rearwardly if it is desired to adjust the frame downwardly. After the frame has been adjusted into desired position, the latch 20 is released for engagement with the notched sector 19, the latch when in engagement with the notched sector holding the frame in adjusted position.

A front bearing bracket 21 is arranged within the frame 1 forwardly of the axle 5 and is fixed to a sleeve 22 which surrounds the axle 5 and is located within the frame and terminally secured to the frame bars 3. The bearing bracket 21 inclines downwardly and forwardly from the sleeve 22. A rear bearing bracket 23 of substantially U-form is secured at its ends to the rear ends of the frame bars 3 and inclines downwardly and forwardly from said ends of said frame bars. The bracket 21 is provided at its front or lower end with bearings 24 which are arranged at opposite sides of the longitudinal center of the machine, and the bracket 23 is provided at its lower or front end with bearings 25 also arranged at opposite sides of the longitudinal center of the machine.

The bearings 24 are mounted in the bracket 21 for movement relatively and transversely of the machine, and the bearings 25 are mounted in the bracket 23 for movement relatively and transversely of the machine. The bearings 24 are constantly urged in the direction of the longitudinal center of the machine by springs 26, and the bearings 25 are constantly urged in the direction of said center by springs 27. The bearings 24 and 25 are of the anti-friction type and rotatably support shafts 28 upon which are fixedly secured stalk pulling rollers 29. The rollers are provided with coverings 30 of rubber or the like, and the coverings are provided with longitudinally extending ribs 31. The rollers 29 occupy an upwardly and forwardly inclined position and are arranged at opposite sides of the longitudinal center of the machine.

Gears 32 are loosely mounted upon the axle 5 laterally beyond the frame bars 3, and mesh with pinions 33 fixed to the ends of a shaft 34 journaled, as at 35, in said frame bars. Beveled gears 36 which are splined to the shaft 34 and movable axially thereon, mesh with similar gears 37 fixed to the upper ends of the shafts 28. The rollers 29 are constantly urged in the direction of each other and the longitudinal center of the machine by the springs 26 and 27, and due thereto, they may yield laterally under the influence of a large or solid article passing between the same whereby to prevent injury to their coverings 30 and ribs 31. To insure the constant meshing of the gears 36 and 37, the gears 36 are connected to the shafts 28 by yokes 38.

The bracket 23 is provided at its lower or front end, and rearwardly of the bearings 25, with bearings 39 which receive the lower ends of shafts 40. The upper ends of the shafts 40 are journaled in bearings 41 carried by a bar 42 which is secured to and extends across the frame 1. The shafts 40 are supported by the bearings 39 and 41 in an upwardly and rearwardly inclined position. Grinding rollers 43 are fixed to the shafts 40 and are provided with spiral cutting ribs 44. The rollers 43 are arranged at opposite sides of the longitudinal center of the machine and incline upwardly and rearwardly from the lower rear ends of the stalk pulling rollers 29. A shaft 45 extending transversely of the frame 1, and journaled therein, as at 46, has fixed thereto beveled gears 47 which mesh with similar gears 48 fixed to the upper ends of the shafts 40. The shaft 45 has fixed thereto pinions 49 which mesh with the gears 32.

The hubs 50 of the gears 32 are provided with ratchet teeth 51 which engage similar teeth 52 on ratchet sleeves 53 splined to the hubs 54 of the wheels 2, the ratchet sleeves 53 being held in engagement with the ratchet hubs 50 by springs 55 and establish a driving connection between the wheels and gears 32.

A casing 56 is provided for the gears 36 and 37, a casing 57 is provided for the gears 47 and 48, and guards 58 are provided for the grinding rollers 43. The guards 58 are of semi-cylindrical formation and are arranged at the outer sides of the grinding rollers 43, and they are secured to the bar 42.

In practice, when the machine is drawn over a field, the stalk pulling rollers 29 and the stalk grinding rollers 43 are rotated through the medium of the wheels 2 and the gearing establishing connection between the wheels and shafts of the rollers, the gearing being such as to drive the rollers at the same rate of speed. As the pulling rollers occupy an upwardly and forwardly inclined position, they will engage the stalks and pull them from the ground, the stalks passing from the rollers 29 to and between the rollers 43 which grind the stalks and deposit the ground stalks upon the ground. The ratchets connecting the wheels 2 and the gears 32 permit differential rotation of the wheels while the machine is being turned. The adjustability of the frame 1 permits the pulling rollers 29 to be moved bodily toward and away from the ground so as to adapt the machine for pulling long and short stalks.

The machine is adapted for pulling and grinding cotton, corn and other stalks, and it is provided with fingers 59 which comprise rods 60 secured to the frame bars 3 at opposite sides of the stalk pulling rollers 29 and extending downwardly and forwardly from the frame, and rods 61 extending from the front ends of the rods 60 in the direction of the pulling rollers, the fingers serving to pick up and convey corn stalks to these rollers. The machine as illustrated is adapted to pull and grind the stalks of a single row during each of its movements across the field. By providing the machine with two sets of pulling rollers and two sets of grinding rollers, it will be adapted to pull and grind two rows of stalks during each of its movements across the field.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A machine of the character stated, comprising a wheel supported frame, stalk pulling rollers rotatably supported in an upwardly and forwardly inclined position from the frame, stalk grinding means supported from the frame rearwardly of the pulling rollers and adapted to receive the stalks therefrom, and means connecting the rollers and said first means to the wheels for operation thereby.

2. A machine of the character stated, comprising a wheel supported frame, stalk pulling rollers rotatably supported in an upwardly and forwardly inclined position from the frame, rubber coverings for the rollers provided with longitudinal ribs, stalk grinding means supported from the frame rearwardly of the rollers and adapted to receive the stalks therefrom, and means connecting the rollers and said first means to the wheels for operation thereby.

3. A machine of the character stated, comprising a wheel supported frame, front and rear brackets extending downwardly and forwardly from the frame, bearings mounted in the lower end of each bracket for lateral movement with respect to each other, springs urging the bearings in the direction of each other, shafts journaled in the bearings and supported thereby in an upwardly and forwardly inclined position, stalk pulling rollers fixed to the shafts, stalk grinding means supported from the frame rearwardly of the rollers and adapted to receive the stalks therefrom, and means connecting the shafts and said first means to the wheels for operation thereby.

4. A machine of the character stated, comprising a wheel supported frame, front and rear brackets extending downwardly and forwardly from the frame, bearings mounted in the lower end of each bracket for lateral movement with respect to each other, springs urging the bearings in the direction of each other, shafts journaled in the bearings and supported thereby in an upwardly and forwardly inclined position, stalk pulling rollers fixed to the shafts, lower bearings carried by the lower ends of the rear bracket, upper bearings carried by the frame in alinement with the lower bearings, shafts journaled in said lower and upper bearings, grinding rollers fixed to said last shafts, and means connecting the shafts to the wheels for operation thereby.

5. A machine of the character stated, comprising a wheel supported frame, front and rear brackets extending downwardly and forwardly from the frame, bearings mounted in the lower end of each bracket for lateral movement with respect to each other, springs urging the bearings in the direction of each other, shafts journaled in the bearings and supported thereby in an upwardly and forwardly inclined position, stalk pulling rollers fixed to the shafts, lower bearings carried by the lower ends of the rear bracket, upper bearings carried by the frame in alinement with the lower bearings, shafts journaled in said lower and upper bearings, grinding rollers fixed to said last shafts, gears fixed to the upper ends of the shafts, shafts journaled on the frame and provided with gears meshing with said first gears, and means connecting said last shafts to the wheels for operation thereby.

6. A machine of the character stated, comprising a wheel supported frame, front and rear brackets extending downwardly and forwardly from the frame, bearings mounted in the lower end of each bracket for lateral movement with respect to each other, springs urging the bearings in the direction of each other, shafts journaled in the bearings and supported thereby in an upwardly and forwardly inclined position, stalk pulling rollers fixed to the shafts, lower bearings carried by the lower ends of the rear bracket, upper bearings carried by the frame in alinement with the lower bearings, shafts journaled in said lower and upper bearings, grinding rollers fixed to said last shafts, gears fixed to the upper ends of the shafts, shafts journaled on the frame and provided with gears meshing with said first gears, other gears journaled on the main frame, pinions fixed to said last shafts and meshing with said other gears, and ratchet means connecting the wheels to said other gears.

7. A machine of the character stated, comprising a wheel supported frame, stalk pulling rollers rotatably supported in an upwardly and forwardly inclined position from the frame and arranged at opposite sides of the longitudinal center, stalk grinding rollers supported from the frame rearwardly of the pulling rollers and at opposite sides of the longitudinal center of the frame, the grinding rollers extending upwardly and rearwardly from the lower ends of the pulling rollers and adapted to receive the stalks from the latter, and means connecting the rollers to the wheels for operation thereby.

8. A machine of the character stated, comprising a wheel supported axle, a frame rotatably mounted on the axle, a draft yoke connected to the axle, means carried by the frame and draft yoke to permit the frame to be adjusted into a horizontal or inclined position and secured in adjusted position, stalk pulling rollers rotatably supported in an upwardly and forwardly inclined position from the frame, stalk grinding means supported from the frame rearwardly of the rollers and adapted to receive the stalks therefrom, and means connecting the rollers and said first means to the wheels for operation thereby.

In testimony whereof I hereunto affix my signature.

JAMISON B. BAILEY.